(12) United States Patent
Miller et al.

(10) Patent No.: US 10,334,334 B2
(45) Date of Patent: Jun. 25, 2019

(54) STORAGE SLED AND TECHNIQUES FOR A DATA CENTER

(71) Applicant: INTEL CORPORATION, Santa Clara, CA (US)

(72) Inventors: Steven C. Miller, Livermore, CA (US); Michael Crocker, Portland, OR (US); Aaron Gorius, Upton, MA (US); Paul Dormitzer, Acton, MA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/394,338

(22) Filed: Dec. 29, 2016

(65) Prior Publication Data

US 2018/0024771 A1    Jan. 25, 2018

Related U.S. Application Data

(60) Provisional application No. 62/427,268, filed on Nov. 29, 2016, provisional application No. 62/376,859, (Continued)

(51) Int. Cl.
*G06F 12/10* (2016.01)
*H04Q 11/00* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01); *G06F 3/064* (2013.01); *G06F 3/067* (2013.01); *G06F 3/0611* (2013.01); (Continued)

(58) Field of Classification Search
CPC ........ G06F 3/0658; G06F 3/061; G06F 1/183; G06F 3/0659; G06F 3/0683; G06F 3/0616; G06F 1/18; G06F 3/06
USPC ...................................................... 711/154
See application file for complete search history.

(56) References Cited

U.S. PATENT DOCUMENTS 5,652,697 A    7/1997   Le
9,167,705 B2  10/2015   Kyle
(Continued)

FOREIGN PATENT DOCUMENTS

WO   2012113807   8/2012

OTHER PUBLICATIONS

International Search Report received for PCT Patent Application No. PCT/US2017/038686, dated Oct. 13, 2017, 3 pages.
(Continued)

*Primary Examiner* — Pierre Miche Bataille

(57) ABSTRACT

Examples may include a sled for a rack of a data center including physical storage resources. The sled comprises an array of storage devices and an array of memory. The storage devices and memory are directly coupled to storage resource processing circuits which are themselves, directly coupled to dual-mode optical network interface circuitry. The circuitry can store data on the storage devices and metadata associated with the data on non-volatile memory in the memory array.

21 Claims, 11 Drawing Sheets

Related U.S. Application Data filed on Aug. 18, 2016, provisional application No. 62/365,969, filed on Jul. 22, 2016.

(51) Int. Cl.

| | |
|---|---|
| H03M 7/40 | (2006.01) |
| H03M 7/30 | (2006.01) |
| G06F 16/901 | (2019.01) |
| G06F 3/06 | (2006.01) |
| G11C 7/10 | (2006.01) |
| H05K 7/14 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 29/08 | (2006.01) |
| H04L 12/26 | (2006.01) |
| H04L 12/851 | (2013.01) |
| G06F 9/50 | (2006.01) |
| H04L 12/911 | (2013.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/931 | (2013.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04L 12/811 | (2013.01) |
| G06F 17/30 | (2006.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.
CPC .......... *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06F 17/30949* (2013.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L*

67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/306 (2013.01); H04L 67/34 (2013.01); H04L 69/04 (2013.01); H04L 69/329 (2013.01); H04Q 1/04 (2013.01); H04Q 11/00 (2013.01); H04Q 11/0003 (2013.01); H04Q 11/0062 (2013.01); H04Q 11/0071 (2013.01); H04W 4/023 (2013.01); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1447 (2013.01); H05K 7/1461 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); G06F 2209/5019 (2013.01); G06F 2209/5022 (2013.01); G06F 2212/1008 (2013.01); G06F 2212/1024 (2013.01); G06F 2212/1041 (2013.01); G06F 2212/1044 (2013.01); G06F 2212/152 (2013.01); G06F 2212/202 (2013.01); G06F 2212/401 (2013.01); G06F 2212/402 (2013.01); G06F 2212/7207 (2013.01); G06Q 10/087 (2013.01); G06Q 10/20 (2013.01); G06Q 50/04 (2013.01); G08C 2200/00 (2013.01); H04B 10/25 (2013.01); H04L 41/12 (2013.01); H04L 41/5019 (2013.01); H04L 43/065 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/80 (2018.02); H05K 7/1485 (2013.01); H05K 2201/066 (2013.01); H05K 2201/10121 (2013.01); H05K 2201/10159 (2013.01); H05K 2201/10189 (2013.01); Y02D 10/14 (2018.01); Y02D 10/151 (2018.01); Y02P 90/30 (2015.11); Y10S 901/01 (2013.01)

(56) References Cited

U.S. PATENT DOCUMENTS

| | | | |
|---|---|---|---|
| 9,433,119 | B2 | 8/2016 | Canfield et al. |
| 9,448,599 | B2 | 9/2016 | Ehlen et al. |
| 9,456,519 | B2 | 9/2016 | Bailey et al. |
| 9,706,677 | B2 | 7/2017 | Cravens et al. |
| 2001/0001529 | A1 | 5/2001 | Behl et al. |
| 2005/0012119 | A1 | 1/2005 | Herner et al. |
| 2006/0242380 | A1 | 10/2006 | Korgaonkar et al. |
| 2007/0230109 | A1 | 10/2007 | Starr et al. |
| 2009/0063510 | A1 | 3/2009 | Yamagishi |
| 2009/0097200 | A1 | 4/2009 | Sharma et al. |
| 2010/0142544 | A1 | 6/2010 | Chapel et al. |
| 2012/0020663 | A1 | 1/2012 | McLaren et al. |
| 2013/0166820 | A1* | 6/2013 | Batwara ............ G06F 12/0246 711/103 |
| 2014/0085807 | A1 | 3/2014 | Ning et al. |
| 2014/0140689 | A1 | 5/2014 | Dahlfort et al. |
| 2014/0188996 | A1 | 7/2014 | Lie et al. |
| 2014/0281152 | A1 | 9/2014 | Karamcheti et al. |
| 2015/0113235 | A1 | 4/2015 | Morris et al. |
| 2015/0189787 | A1 | 7/2015 | Bailey et al. |
| 2015/0350023 | A1 | 12/2015 | Srinivas et al. |
| 2015/0355686 | A1 | 12/2015 | Heyd et al. |
| 2015/0356005 | A1* | 12/2015 | Hayes ................ G06F 12/0238 711/102 |
| 2015/0372781 | A1 | 12/2015 | Frankel et al. |
| 2016/0055119 | A1 | 2/2016 | Egi et al. |
| 2016/0073545 | A1 | 3/2016 | Cravens et al. |
| 2016/0132265 | A1 | 5/2016 | Yi et al. |
| 2016/0286682 | A1 | 9/2016 | Canfield et al. |
| 2016/0328159 | A1* | 11/2016 | Coddington .......... G06F 3/0613 |
| 2017/0031945 | A1* | 2/2017 | Sarab ............... G06F 17/30156 |
| 2017/0055362 | A1 | 2/2017 | Bailey et al. |
| 2017/0094828 | A1 | 3/2017 | Van Pelt et al. |
| 2017/0135243 | A1 | 5/2017 | Canfield et al. |

OTHER PUBLICATIONS

International Search Report received for PCT Patent Application No. PCT/US2017/038688, dated Oct. 23, 2017, 7 pages.
International Search Report received for PCT Patent Application No. PCT/US2017/038660, dated Oct. 17, 2017, 5 pages.

* cited by examiner

200

*Logic Flow*
*900*

Receive, at a sled in a data center, an information element to include indications of data to write to non-volatile memory of the sled.
910

Determine, by processing circuitry of the sled, a location in non-volatile memory to write the data.
920

STORAGE SLED AND TECHNIQUES FOR A DATA CENTER

RELATED APPLICATIONS

This application claims priority to: U.S. Provisional Patent Application entitled "Framework and Techniques for Pools of Configurable Computing Resources" filed on Nov. 29, 2016 and assigned Ser. No. 62/427,268; U.S. Provisional Patent Application entitled "Scalable System Framework Prime (SSFP) Omnibus Provisional II" filed on Aug. 18, 2016 and assigned Ser. No. 62/376,859; and U.S. Provisional Patent Application entitled "Framework and Techniques for Pools of Configurable Computing Resources" filed on Jul. 22, 2016 and assigned Ser. No. 62/365,969, all of which are hereby incorporated by reference in their entirety.

TECHNICAL FIELD

Examples described herein are generally related to data centers and particularly to storage sleds to couple physical storage resources in a data center.

BACKGROUND

Advancements in networking have enabled the rise in pools of configurable computing resources. A pool of configurable computing resources may be formed from a physical infrastructure including disaggregate physical resources, for example, as found in large data centers. The physical infrastructure can include a number of resources having processors, memory, storage, networking, power, cooling, etc. Management entities of these data centers can aggregate a selection of the resources to form servers and/or computing hosts. These hosts can subsequently be allocated to execute and/or host system software (SW), e.g., operating systems (OSs), virtual machines (VMs), Containers, Applications, or the like. The amount of data storage in data centers continues to increase, often at exponential levels, thus requiring physical storage resources in the data center. The present disclosure is directed to such physical storage resources.

DETAILED DESCRIPTION

Figure 1:
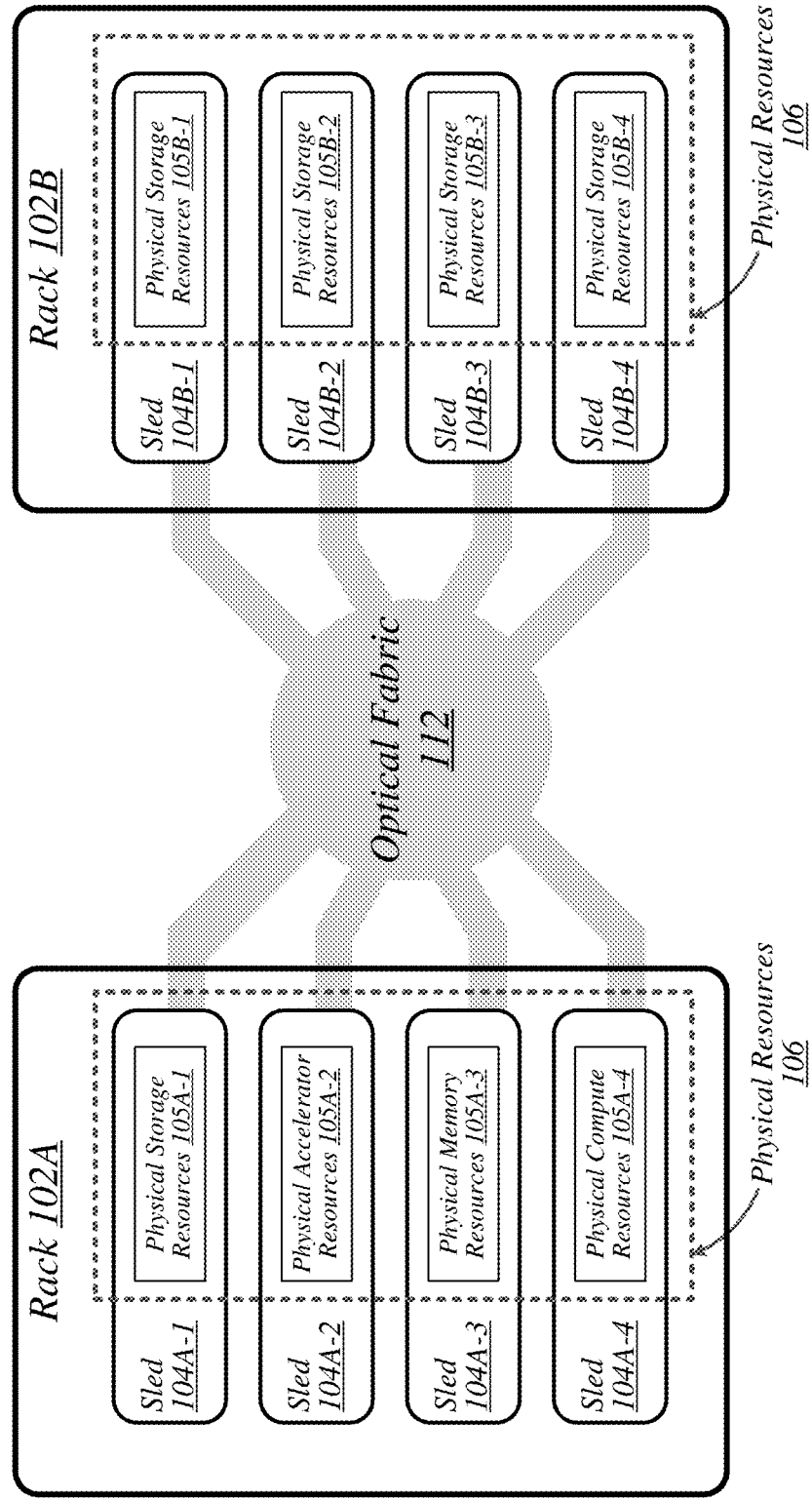
FIG. 1 illustrates a first example data center.

Data centers may generally be composed of a large number of racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks.

These physical resources are often arranged in racks within a data center. The present disclosure provides racks arranged to receive a number of sleds, where each sled can house a number of physical resources. This disclosure provides examples of sleds to couple a number of physical storage resources (e.g., solid-state-drives (SSDs), non-volatile memory modules, or the like) to a data center. For example, such sleds can couple to a rack using automated techniques, like, robotic coupling or manipulation, is provided. The sled can accommodate a number of storage devices and can couple the storage devices to an optical fabric provided in the data center. Furthermore, the sled can accommodate automated removal and/or installation of the storage devices. More specifically, as will be described in greater detail below, the sled can accommodate robotic installation and/or removal of the storage devices.

The sled can include a dual-mode optical network interface operable to couple to the storage devices on the sled (e.g., based on electrical signaling) and couple to an optical fabric in the data center (e.g., based on optical signaling).

The sleds can include both a removable storage device array and a memory array. The removable storage device array can comprise non-volatile memory while the memory array can comprise a combination of volatile and non-volatile memory. In some examples data can be stored on the removable storage device array while metadata corresponding to such data can be stored on the memory array. This, and other features of the present disclosure will be described in greater detail below.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in this figure, data center 100 contains two racks 102A to 102B. Each of these two racks 102A to 102B may generally house a number of sleds. As shown in this figure, each of racks 102A to 102B contains four sleds 104A-1 to 104A-4 and 104B-1 to 104B-4, respectively. The depicted sleds and racks house computing equipment comprising respective sets of physical resources 105A/B. In particular, physical resources 105A-1 to 105A-4 and 105B-1 to 105B-4 are depicted. A collective set of physical resources 106 of data center 100 includes the various sets of physical resources 105 (e.g., 105A-1 to 105A-4 and 105B-1 to 105B-4) that are distributed among racks 102A to 102B.

Physical resources 106 may include resources of multiple types, such as—for example—processors, co-processors, accelerators, field-programmable gate arrays (FPGAs), memory, and storage. The embodiments are not limited to these examples. In this particular non-limiting example, physical resources 105A may thus be made up of the respective sets of physical resources housed in rack 102A, which includes physical storage resources 105A-1, physical accelerator resources 105A-2, physical memory resources 105A-3, and physical compute resources 105A-4 comprised in the sleds 104A-1 to 104A-4 of rack 102A. In some implementations, a rack may include a number of like physical resources. For example, rack 102B is depicted including physical storage resources housed in each of sleds 104B-1 to 104B-4 of rack 102B. More specifically, sleds 104B-1 to 104B-4 respectively house, physical storage resources 105B-1, physical storage resources 105B-2, physical storage resources 105B-3, and physical storage resources 105B-4.

It is noted, that embodiments are not limited to this example. Furthermore, each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while memory, such as dual in-line memory modules (DIMMs), are located on a bottom side of the sled. As a result of the enhanced airflow provided by this design, at least some components may operate at higher frequencies and power levels than in typical systems, thereby increasing performance. Furthermore, the sleds are configured to blindly mate with power and data communication cables in each rack 102A to 102B, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local.

More specifically, data center 100 may feature optical fabric 112. Optical fabric 112 may generally comprise a combination of optical signaling media (such as optical cabling) and optical switching infrastructure via which any particular sled in data center 100 can send signals to (and receive signals from) each of the other sleds in data center 100. The signaling connectivity that optical fabric 112 provides to any given sled may include connectivity both to other sleds in a same rack and sleds in other racks. In the particular non-limiting example depicted in this figure, data center 100 comprises two racks (e.g., rack 102A to 102B) each including four sleds (e.g., 104A-1 to 104A-4 and 104B-1 to 104B-4, respectively). Thus, in this example, data center 100 comprises a total of eight sleds. Via optical fabric 112, each such sled may possess signaling connectivity with each of the seven other sleds in data center 100. For example, via optical fabric 112, sled 104A-1 in rack 102A may possess signaling connectivity with sled 104A-2, 104A-3 and 104A-4 in rack 102A, as well as the four other sleds 104B-1, 104B-2, 104B-3, and 104B-4 that are distributed among the other rack 102B of data center 100. The embodiments are not limited to this example.

In various embodiments, dual-mode optical switches (refer to FIGS. 5-10) may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of optical fabric 112. Thus, as depicted, with respect to any particular pair of sleds in data center 100, signaling connectivity via the optical fabric may provide support for link-layer connectivity via both Ethernet links and HPC links. Thus, both Ethernet and HPC communications can be supported by a single high-bandwidth, low-latency switch fabric. The embodiments are not limited to this example. However, it is worthy to note, that the dual-mode optical switches provide for separate fault domains within a single sled. As such, information can be written across fault domains at the sled level, as opposed to the rack level to provide data loss, corruption, or failure mitigation at the sled level.

The racks 102A and 102B of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A and 102B include integrated power sources that receive a greater voltage than is typical for power sources. In particular examples, each of the sleds can include an associated power supply. The increased voltage enables the power sources to provide additional power to the components on each sled, enabling the components to operate at higher than typical frequencies.

As noted, the present disclosure provides sleds, and particularly, sleds comprising and/or arranged to comprise physical storage resources. Examples of such sleds are provides with respect to FIGS. 5-10. However, a number of example racks arranged to house such sleds are depicted and described before, with respect to FIGS. 2-4.

Figure 2:
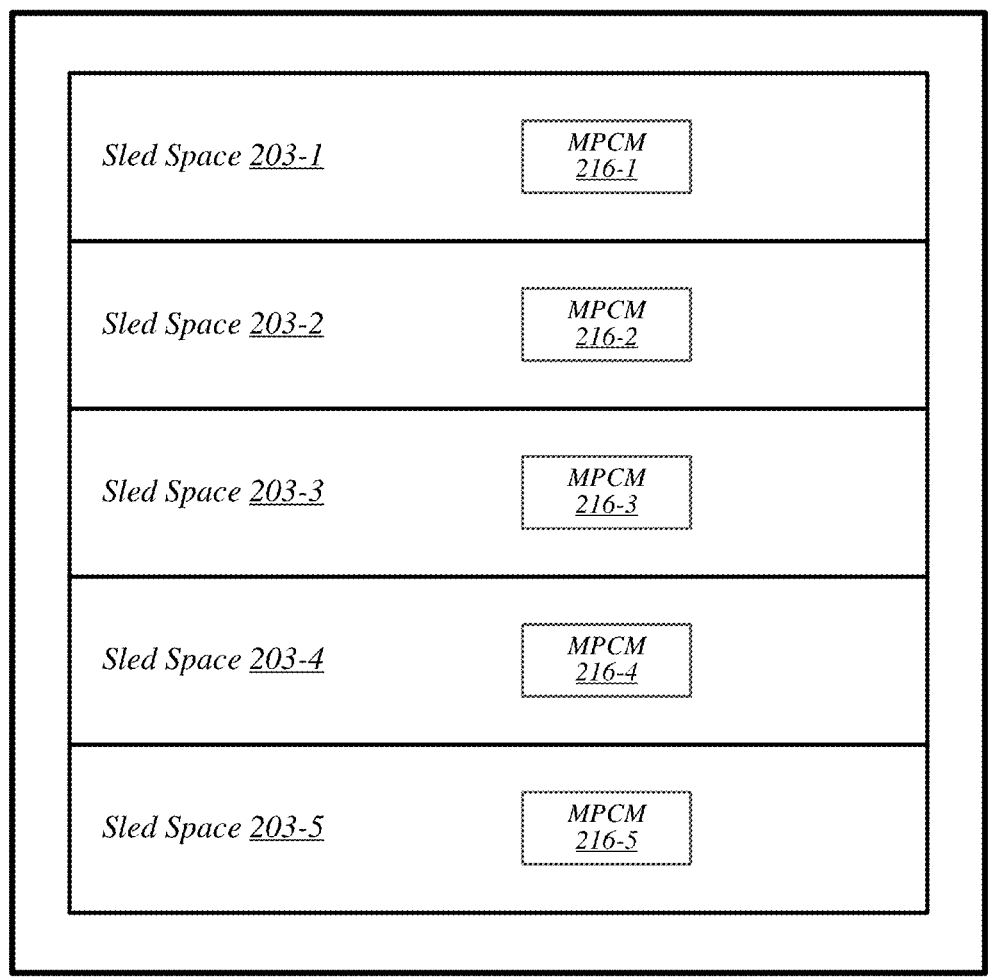
FIG. 2 illustrates a first example rack of a data center.

FIG. 2 illustrates a general overview of a rack architecture 200 that may be representative of an architecture of any particular one of the racks depicted in FIG. 1, according to some embodiments. As reflected in this figure, rack architecture 200 may generally feature a plurality of sled spaces into which sleds may be inserted, each of which may be robotically-accessible via a rack access region 201. In the particular non-limiting example depicted in this figure, rack architecture 200 features five sled spaces 203-1 to 203-5. Sled spaces 203-1 to 203-5 feature respective multi-purpose connector modules (MPCMs) 216-1 to 216-5. These MPCMs may be arranged to receive a corresponding MPCM of a sled (refer to FIGS. 5-10) to mechanically, optically, and/or electrically couple the sleds to rack architecture 200, and particularly to an optical fabric of a data center to associated power sources for each sled space 203-1 to 203-5.

Figure 3:
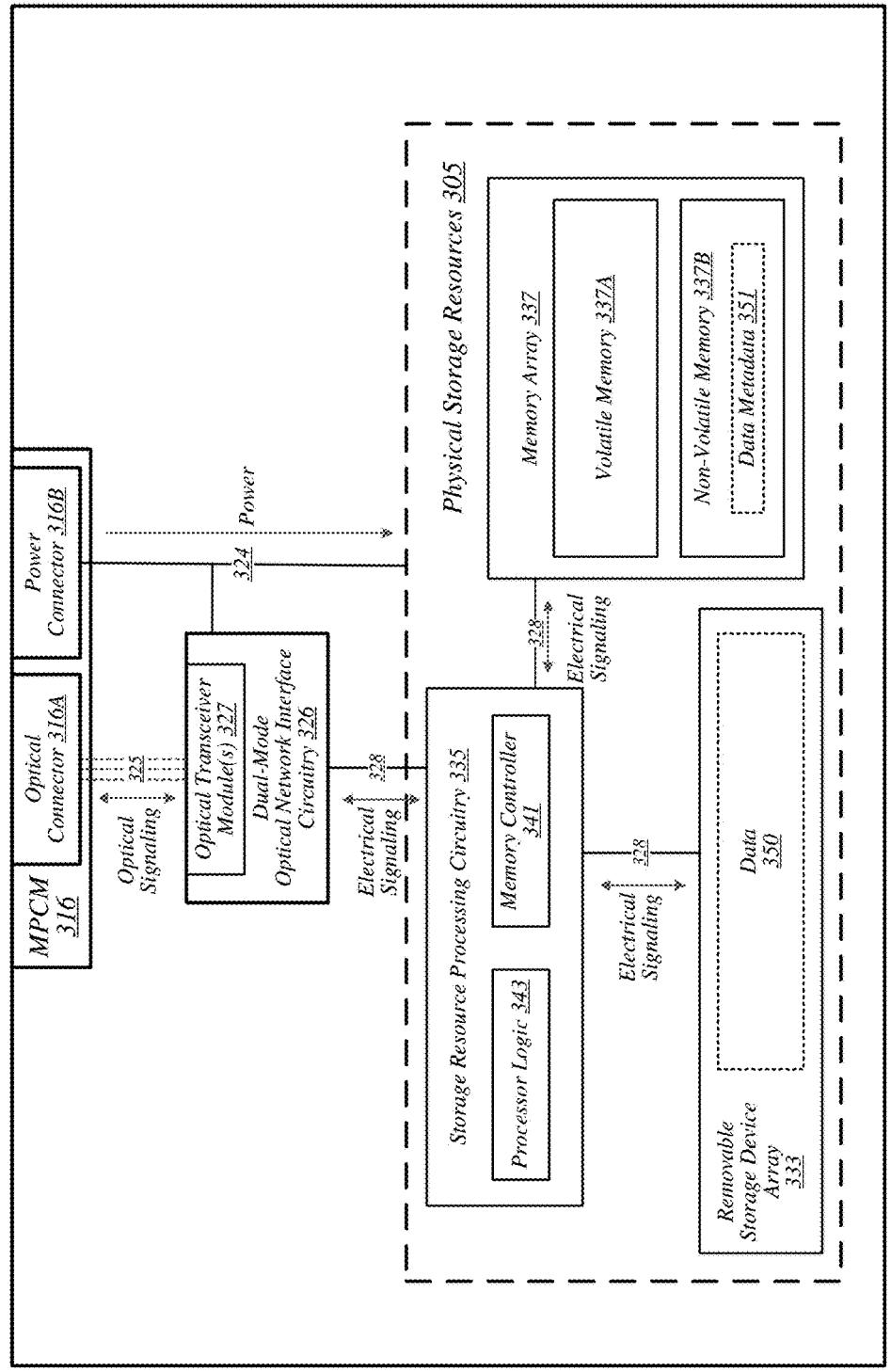
FIG. 3 illustrates a first example sled.

FIG. 3 illustrates an example of a sled 304 that may be representative of a sled designed for use in conjunction with a rack according to some embodiments (e.g., racks according to rack architecture 200, or the like). Sled 304 may feature an MPCM 316 that comprises an optical connector 316A and a power connector 316B. Generally speaking, MPCM 316 is designed to couple with a counterpart MPCM of a sled space in conjunction with insertion of sled 304 into that sled space. Coupling MPCM 316 with such a counterpart MPCM may cause power connector 316B to couple with a power connector comprised in the counterpart MPCM. This may generally enable physical storage resources 305 of sled 304 to source power from an external source, via power connector 316B and power transmission media 324 that conductively couples power connector 316B to physical storage resources 305.

Physical storage resources 305 can generally include a removable storage device array 333, storage resource processing circuitry 335, and a memory array 337. In some examples, the removable storage device array 333 can include a number of storage devices (e.g., SSDs, non-volatile memory modules, or the like) and can have any capacity. In some examples, the removable storage device array 333 can have between 0.5 and 2 peta-bytes of storage capacity. More specifically, with some non-limiting examples, the removable storage device array 333 can accommodate between 2 and 24 removable devices. In a particular example, removable storage drive array 333 can accommodate 4 removable devices. In another particular example, removable storage drive array 333 can accommodate 16 removable devices.

For illustration purposes only, it is assumed that the sled can accommodate 16 removable drives. In this example, where each one of the removable devices provides 32 tera-bytes of capacity, the sled 304 may provide a total of 0.5 peta-bytes of capacity. Whereas, where each one of the removable devices provides 128 tera-bytes of capacity, the sled 304 may provide a total of 2 peta-bytes of capacity.

In some examples, memory array 337 can include volatile memory 337A and non-volatile memory 337B. For example, memory array 337 can include a combination of DIMMs coupled to storage resource processing circuitry via electrical signaling media 328. In some examples, memory array 337 can include random-access memory (RAM), dynamic RAM (DRAM), synchronous DRAM (SDRAM), double-data rate SDRAM, NAND memory, NOR memory, three-dimensional (3D) cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase-change RAM (PRAM), resistive RAM (RRAM), magnetoresistive RAM (MRAM), spin transfer torque MRAM (STT-MRAM) memory, non-volatile static RAM (nvSRAM), conductive-bridging RAM (CBRAM), nano-RAM (NRAM), floating junction gate RAM (FJG RAM), or the like. With some examples, memory array 337 can include a combination of such memory modules, for example, a combination of DRAM and 3D cross-point memory.

Sled 304 may also include dual-mode optical network interface circuitry 326. Dual-mode optical network interface circuitry 326 may generally comprise circuitry that is capable of communicating over optical signaling media according to each of multiple link-layer protocols supported by an optical fabric (e.g., optical fabric 112 of FIG. 1, or the like). In some embodiments, dual-mode optical network interface circuitry 326 may be capable both of Ethernet protocol communications and of communications according to a second, high-performance protocol. In various embodiments, dual-mode optical network interface circuitry 326 may include one or more optical transceiver modules 327, each of which may be capable of transmitting and receiving optical signals over each of one or more optical channels. The embodiments are not limited in this context.

Coupling MPCM 316 with a counterpart MPCM of a sled space in a given rack may cause optical connector 316A to couple with an optical connector comprised in the counterpart MPCM. This may generally establish optical connectivity between optical cabling of the sled and dual-mode optical network interface circuitry 326, via each of a set of optical channels 325. With some examples, optical channels 325 comprise 4 optical fiber channels. With some examples, each of the optical channels can provide between 20 and 220 Gigabytes per second (GB/s) bandwidth. With a specific example, each of the optical channels can provide 50 GB/s bandwidth. As another specific example, each of the optical channels can provide 200 GB/s bandwidth. Dual-mode optical network interface circuitry 326 may communicate with the physical resources 305 of sled 304 via electrical signaling media 328.

The storage resource processing circuitry 335 can include a memory controller 341 and processor logic 343. Memory controller 341 can be configured to coordinate access (e.g., writing, reading, or the like) to the devices of the removable storage device array 333 and to memory array 337. In some examples, the storage resource processing circuitry 335 can provide caching, striping, pooling, compression, data duplication, thin provisioning, data cloning, or other data management techniques for the physical storage resources 305. In some examples, the individual devices of the removable storage device array 333 can be coupled to the storage resources processing circuitry 335 via any of a variety of interconnects, such as, for example, peripheral component interconnect express (PCIe), a proprietary interconnect, or the like. In some examples, electrical signaling media 328 can operate according to a variety of interconnect standards, such as, for example, Peripheral Component Interconnect (PCI) Express Base Specification, revision 3.1a, published in December 2015 ("PCI Express specification" or "PCIe specification") the Non-Volatile Memory Express (NVMe) Specification, revision 1.2a, published in October 2015 ("NVM Express specification" or "NVMe specification"). In some examples, electrical signaling media 528 can operate based on proposed PCIe standards to be published in 2017, such as, 4$^{th}$ Generation PCIe standard (PCIe Gen4).

For example, the electrical signaling media 328 coupling removable storage device array 333 and storage resource processing circuitry 335 can be a 4 lane PCIe Gen4 bus, to provide non-volatile memory express (NVMe) compliant logical device interconnect capabilities. As a specific example, where the removable storage device array 333 accommodates 16 storage devices, the electrical signaling media 328 coupling removable storage device array 333 can provide 16 PCIe Gen4×4 connections. As another example, where the removable storage device array 333 can accommodate 4 storage devices, the electrical signaling media 328 coupling removable storage device array 333 can provide 4 PCI Gen4×4 connections.

With some examples, the electrical signaling media 328 coupling storage resource processing circuitry 335 and dual-mode optical network interface circuitry 326 can comprise PCIe (e.g., PCIe Gen4×4, or the like), or other interface system, such as, for example a proprietary interface.

Processing logic 343 can comprise any of a variety of computer processor logic configured to manipulate data and/or data streams transmitted or received over electrical signaling media 328. For example, processing logic 343 can include compression logic arranged to compress and decompress data indicated in removable storage drive array 333 and/or memory array 337. As another example, processing logic 343 can include encryption logic arranged to encrypt and decrypt data indicated in removable storage drive array 333 and/or memory array 337. Furthermore, as another example, processing logic 343 can include compression logic arranged to compress and decompress data indicated in removable storage drive array 333 and/or memory array 337. Furthermore, it is noted, that the techniques and connectivity schemes detailed herein can be applied to all physical storage resources 305, including both removable storage drive array 333 and memory array 337.

During operation, sled 304 can be implemented to "store data" in a data center, such as, for example, data center 100. In particular, removable storage device array 333 can include data 350. In general, data 350 can include a number of information elements, which can be organized according to any of a variety of data structures. It is to be appreciated, that data stored in a data center, such as data 350, typically has corresponding metadata. In general, metadata for data (e.g., data 350) can comprise information elements including indications of the data, such as, for example, details about data, size, locations, file history, origination, ownership, permissions, characteristics, or the like. In some embodiments, metadata corresponding to data 350 can be stored on memory array 337 as data metadata 351. In particular, data 350 can be stored on removable storage device array 333 while data metadata 351 can be stored on non-volatile memory 337B of memory array 337.

The illustrative embodiment in FIG. 3 provides an advantage in that data access operations (e.g., reading, writing, or the like) to data 350 can include a single memory access request to memory array 337 to access metadata 351 and a single memory access request to removable storage device array 333 to access data. As such, bandwidth can be maximized for accessing data 350 on removable storage device array 333 by not needing to access data metadata 351 via memory array 337. As another example, non-volatile memory 337B may have a lower latency than removable storage device array 333, as such, an increase in data access rates can be realized due to accessing data metadata 351 via memory array 337.

It is noted, that a significant amount of metadata can be maintained for data stored in a data center. For example, for every petabyte of data stored in a datacenter, between 1 and 20 terabytes of metadata can be maintained. Furthermore, it is to be appreciated, that metadata may be manipulated and/or modified at a different, often greater, rate than the data itself. For example, data metadata 351 can be modified at a greater rate than data 350. In some embodiments, storage resource processing circuitry 335 can be configured to compress and decompress data metadata 351. For example, processor logic 343 and memory controller 341 can be arranged to compress data metadata 351 as part of storing data metadata 351 to memory array 337 and to decompress data metadata 351 as part of accessing data metadata 351 from memory array 337. In general, any of a variety of data compression techniques can be implemented, such as, for example, techniques based on Lempel-Ziv (LV) compression, Lempel-Ziv-Welch (LZW) compression, Huffman compression, or the like.

Figure 4:
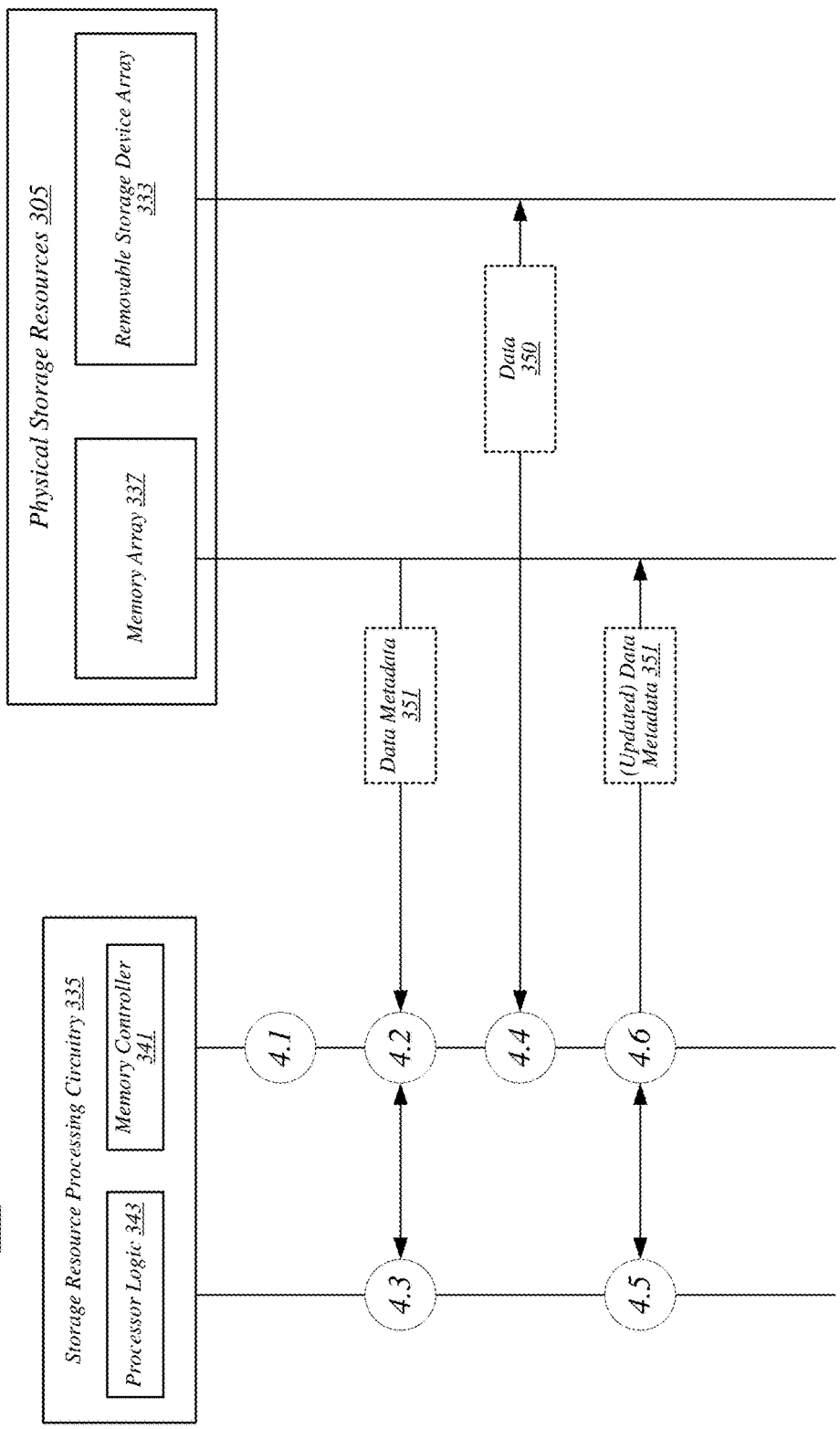
FIG. 4 illustrates a first example technique.

In some examples, processing a request to access data on physical storage resources of a data center can include accessing metadata as a prerequisite to fulfilling the data access request. For example, it may be necessary to access metadata to verify permissions, to determine a data structure for the data, or the like. FIG. 4 illustrates an example of a technique 400 to access data, which may be representative of some or all of the operations executed by one or more logic, features, or devices described herein, such as, for example, sled 304. Although technique 400 can be implemented in any of a variety of data centers and on any of a variety of sleds, including physical storage resources, technique 400 is described with reference to sled 304 depicted in FIG. 3 for convenience and clarity of presentation. This is however not limiting, and technique 400 could be implemented on any system comprising a storage device array (e.g., array 333) and a memory array including both volatile and non-volatile memory (e.g., memory array 337).

As depicted in the illustrative example of FIG. 4, technique 400 can begin at circle 4.1. At circle 4.1, a request to access data stored in physical storage resources of a data center can be received. For example, at circle 4.1, storage resource processing circuitry 335 can receive a request to access data on physical storage resources 305. In a specific example, memory controller 341 can receive a request to access data 350 stored on physical storage resources 305.

Continuing to circle 4.2, metadata corresponding to data associated with the data access request received at circle 4.1 can be accessed. For example, at circle 4.2, storage resource processing circuitry 335 can access data metadata 351 on physical storage resources 305. In a specific example, memory controller 341 can access data metadata 351 stored on memory array 337, and particularly, non-volatile memory 337B.

In some examples, data metadata 351 can be compressed on memory array 337. As such, technique 400 can optionally include circle 4.3 to decompress metadata accessed at circle 4.2. For example, at circle 4.3, storage resource processing circuitry 335 can decompress data metadata 351. In a specific example, processor logic 343 can decompress data metadata 351.

Continuing to circle 4.4, data corresponding to data associated with the data access request received at circle 4.1 can be accessed. For example, at circle 4.4, storage resource processing circuitry 335 can access data 350 on physical storage resources 305. In a specific example, memory controller 341 can access data 350 stored on removable storage device array 333. It is noted, that data access at circle 4.4 can include reading data 350 from removable storage device array 333 or writing data 350 to removable storage device array 333. As such, memory controller 341 can write data 350 to removable storage device array 333 at circle 4.4 or read data 350 from removable storage device array 333 at circle 4.4. Examples are not limited in this context.

In some examples, data metadata may need to be updated as a result of the data access request. For example, it may be necessary to update metadata indicating data/time of last access to data 350, or the like. Furthermore, as detailed, data metadata 351 can be compressed on memory array 337. Accordingly, technique 400 can optionally include circles 4.5 and 4.6 to compress and update data metadata 351. At circle 4.5, storage resource processing circuitry 335 can compress updated data metadata 351. In a specific example, processor logic 343 can compress updated data metadata 351. At circle 4.6, updated data metadata (which may be compressed) 351 can be written to physical storage resources 305. In a specific example, memory controller 341 can write updated data metadata 351 to memory array 337, and particularly non-volatile memory 337B.

Figure 6:
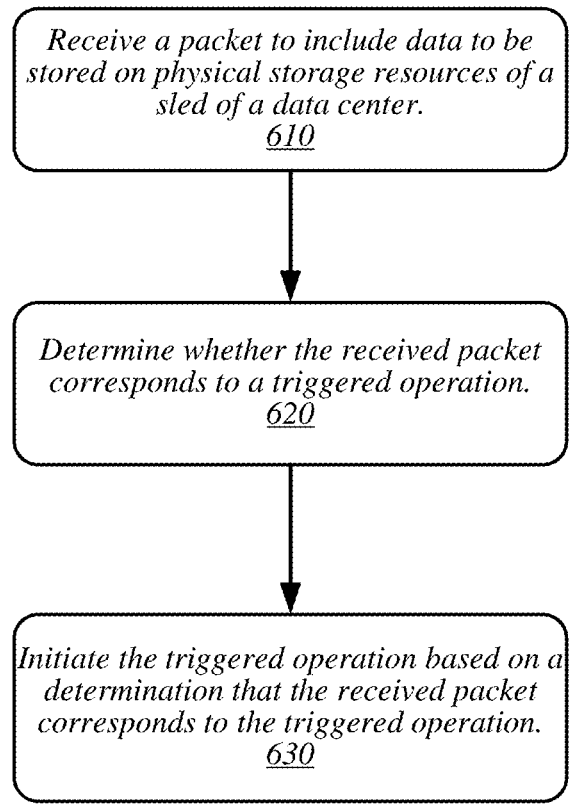
FIG. 6 illustrates a first example logic flow.
Figure 7:
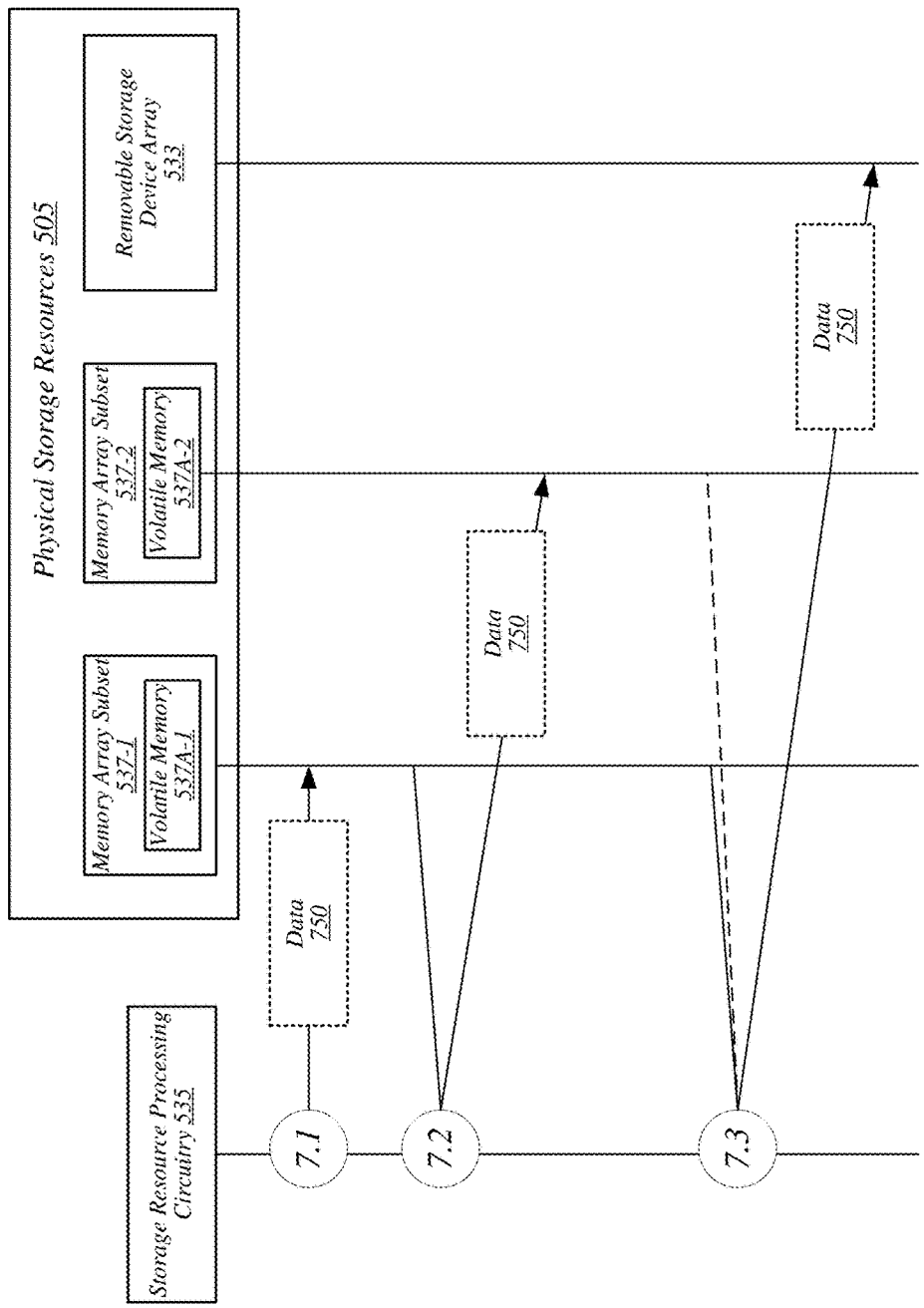
FIG. 7 illustrates a second example technique.

With some embodiments, multiple fault domains can be provided at the level of the sled. For example, the removable storage drive array and the memory array of a sled can be split into subsets to provide multiple fault domains that each include a subset of the removable storage drive array and the memory array. Accordingly, various data management and/or loss mitigation techniques can be implemented at the sled. Such an example sled and associated techniques are described with reference to FIGS. 5-7. In particular, FIG. 5 illustrates an example sled architecture while FIGS. 6-7 illustrates an example logic flow and technique, respectively.

Figure 5:
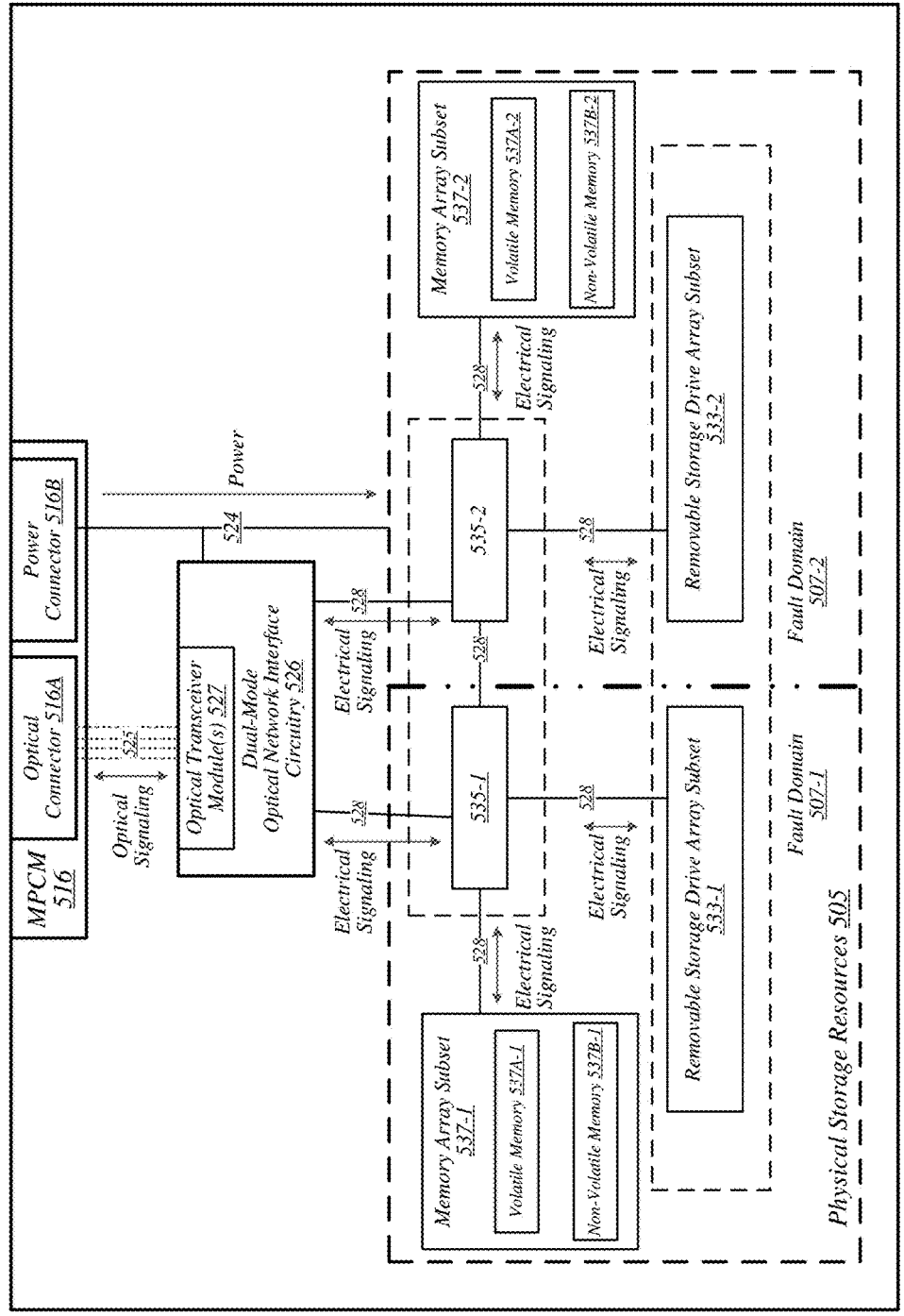
FIG. 5 illustrates a second example sled.

Turning more specifically to FIG. 5, sled 504 is depicted. In general, sled 504 can comprise similar components as sled 304 of FIG. 3. However, the removable storage drive array and memory array are split into two subsets. In particular, sled 504 comprises physical storage resources 505, which include removable storage drive array subsets 533-1 to 533-2, storage resource processing circuitry 535-1 to 535-2, and memory array subsets 537-1 to 537-2. Memory array subsets can each include volatile memory and non-volatile memory portions 537A-1 and 537B-1 and 537A-2 and 537B-2, respectively. As depicted, storage resource processing circuitry 535-1 is operably couple to removable storage drive array subset 533-1 and memory array subset 537-1 while storage resource processing circuitry 535-2 is operably couple to removable storage drive array subset 533-2 and memory array subset 537-2.

Storage resource processing circuitry 535-1 and 535-2 are operably coupled to removable storage drive array subsets and memory array subsets via electrical signaling media 528. Electrical signaling media 538 can be any signaling media, such as, for example, a PCIe Gen4 bus to provide NVMe compliant logical device interconnect capabilities.

Storage resource processing circuitry 535-1 and 535-2 are further operably coupled to dual-mode optical network interface circuitry 526 via electrical signaling medial 528. It is noted, that electrical signaling media 528 coupling dual-mode optical network interface circuitry to storage resource processing circuitry 535-1 and 535-2 can be a different type, configuration, and or support a different signaling standard than electrical signaling media 528 coupling storage resource processing circuitry 535-1 and 535-2 to removable storage drive array subsets and memory array subsets. Examples are not limited in this context.

Furthermore, storage resource processing circuitry 535-1 and 535-2 can be communicatively coupled to each other via electrical signaling media 528. In some examples, electrical signaling media 528 coupling storage resource processing circuitry 535-1 and 535-2 can be PCIe, or a proprietary interface to communicatively couple the storage resource processing circuits. In general, the storage resource processing circuits 535-1 and 535-2 can be configured to communicate via electrical signaling media 528 using small messages having relatively low latency as compared to overall network traffic in the data center. Furthermore, sled 504 can feature dual-mode optical network interface circuitry 526 including optical transceiver module(s) 527 coupled to optical connector 516A of MPCM 516 via optical channels 525. Sled 504 can additionally, feature power connector 516B of MPCM 516 to provide power to components of sled 504 via power transmission media 524.

In some embodiments, physical resources 505 can be split into multiple fault domains. In this illustrative example, sled 504 includes 2 fault domains 507-1 and 507-2. In particular: fault domain 507-1 includes storage resource processing circuitry 535-1, removable storage drive array subset 533-1, and memory array subset 537-1; while fault domain 507-2 includes storage resource processing circuitry 535-2, removable storage drive array subset 533-2 and memory array subset 537-2. Accordingly, during operation, fault domains can "fail over" to each other at the sled level to provide mitigation of data loss.

FIG. 6 illustrates a logic flow, which may be representative of some or all of the operations executed by one or more logic, features, or devices described herein, such as, for example, sled 504. Although logic flow 600 can be implemented on any rack according to some embodiments, the rack 504 depicted in FIG. 5 is used as a reference to describe the example logic flow. However, this is done for convenience and clarity of presentation only and not to be limiting.

In this illustrative example, logic flow 600 can begin at block 610. At block 610 "receive a packet to include data to be stored on physical storage resources of a sled of a data center" a packet including data to be stored on physical storage resources of a sled of a data center can be received. For example, storage resource processing circuitry 535-1 or 535-2 can receive a packet to include indication of data to store on physical storage resources 505. In particular, storage resource processing circuitry 535-1 can receive a packet to include data to be stored on removable storage drive array subset 533-1 or storage resource processing circuitry 535-2 can receive a packet to include data to be stored on removable storage drive array subset 533-2.

Continuing to block 620 "determine whether the received packet corresponds to a triggered operation" a determination of whether the received packet corresponds to a triggered cooperation can be made. For example, the storage resource processing circuitry 535-1 or 535-2 can determine whether the received packet corresponds to a triggered operation. Continuing to block 630 "initiate the triggered operation based on a determination that the received packet corresponds to the triggered operation" the triggered operation can be initiated based on a determination that the received packet corresponds to the triggered operation.

In some examples, the triggered operation can comprise duplicating data across a fault domain. Particularly, packets received from particular entities can be required to be replicated to multiple fault domains. Accordingly, with some examples, storage resource processing circuitry 535-1 or 535-2 can cause the received packet to be written to both fault domains 507-1 and 507-2.

In some examples, the triggered operation can comprise processing the data prior to storing the data on one of the removable storage drive array subsets. Accordingly, storage resource processing circuitry 535-1 or 535-2 can process the received packet. For example, in some embodiments, physical store resources can storage data related to data center operations, such as, for example, telemetry data. In such an example, the triggered operation can be to run various analysis algorithms and/or processes on the telemetry data. As such, at block 630, data corresponding to the packet can be stored (e.g., temporarily) on memory array 537-1 and/or 537-2 and the data processed by storage resource processing logic 535. Post processing, data corresponding to the packet and/or processed data can be stored on removable storage drive array subsets 533-1 and/or 533-2.

Such a sled architecture and logic flow provides an advantage in that computing resources (e.g., physical accelerator resource 105A-2, physical memory resources 105A-3 and/or physical compute resources 105A-4, or the like) can be more fully monetized. More specifically, physical resources (e.g., compute resources, accelerator resources, memory resources, or the like) can be freed from processing telemetry data related to the data center operation; and as such, allocated to computing tasks for which the data center can charge.

FIG. 7 illustrates an example of a technique 700 to write data to physical storage resources of a data center, which may be representative of some or all of the operations executed by one or more logic, features, or devices described herein, such as, for example, sled 504. Although technique 700 can be implemented in any of a variety of data centers and on any of a variety of sleds including physical storage resources, technique 700 is described with reference to sled 504 depicted in FIG. 5 for convenience and clarity of presentation. This is however not limiting, and technique 700 could be implemented on an any system comprising a storage device array (e.g., array 533) and a memory array including both volatile and non-volatile memory (e.g., array 537).

As depicted in this illustrative example, technique 700 can begin at circle 7.1. At circle 7.1 data can be written to volatile memory of a memory array of a sled of a data center. For example, data 750 can be written to volatile memory 537A-1 of memory array subset 537-1. More particularly, an application executing on the data center (e.g., in a VM, in a container, or the like) can write data to volatile memory (e.g., volatile memory of memory array subset 537-1) of physical storage resources 505. In some examples, the application can use remote direct memory access (RDMA) to write data 750 to volatile memory at circle 7.1.

Continuing to circle 7.2 data can be replicated from volatile memory across a fault domain. For example, data 750 can be replicated from volatile memory 537A-1 to volatile memory 537A-2. In particular, storage resource processing circuit 535 can be configured to replicate data 750 across fault domains (e.g., fault domains 507-1 and 507-2, or the like) within the sled 504.

Continuing to circle 7.3 data 750 can be written to removable storage device array 533. More specifically, data can be copied, moved, replicated, or the like from one of volatile memories 537A-1 or 537A-2 to removable storage device array 533 (or an array subset within array 533).

Such a sled architecture and logic flow provides an advantage in that data can be maintained in multiple fault domains while waiting to be written to longer term storage (e.g., removable storage device array 533, or the like).

Figure 8:
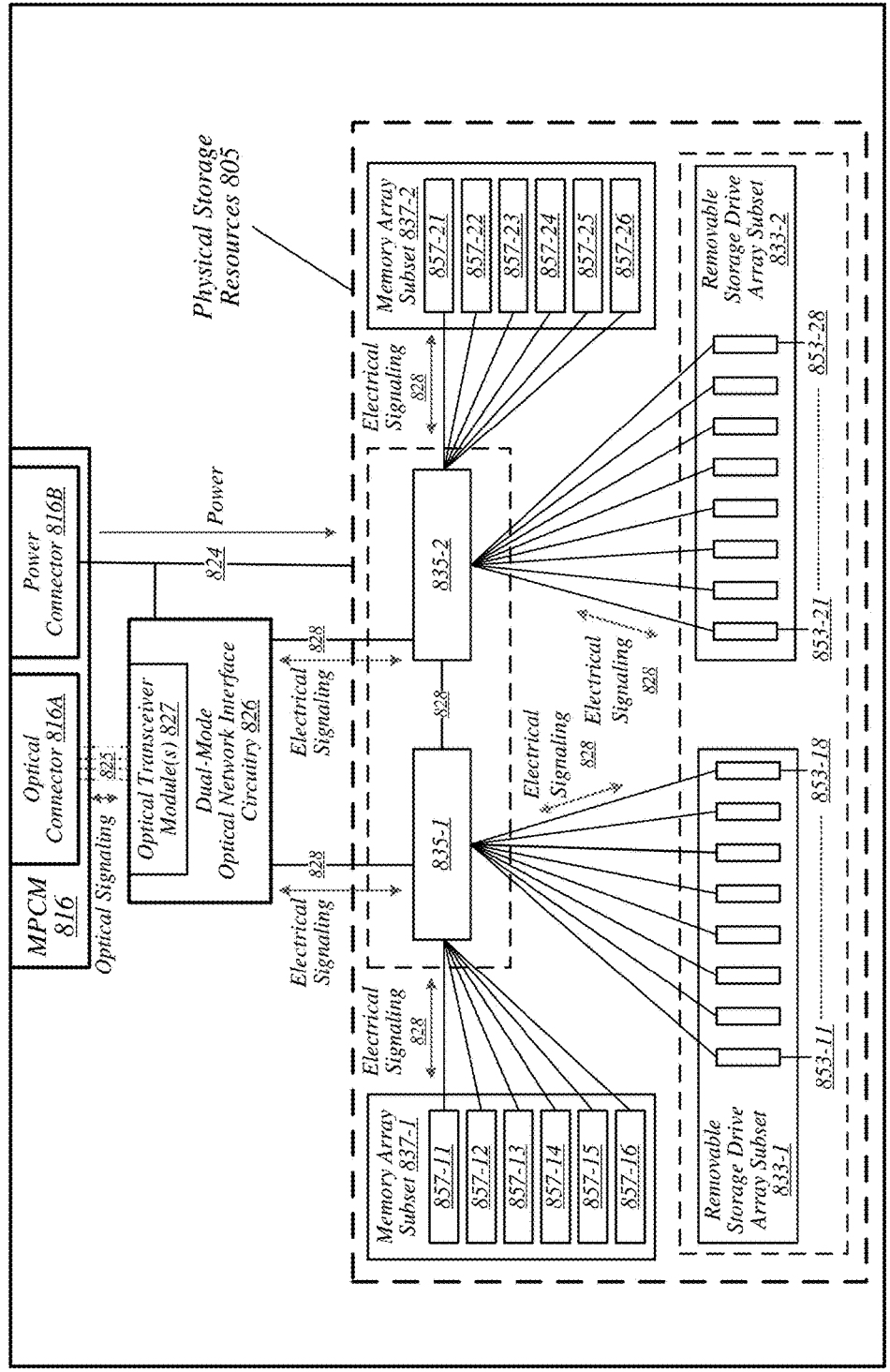
FIG. 8 illustrates a third example sled.

As noted, the removable storage drive array can include a number of storage drives (e.g., SSDs, non-volatile memory modules, or the like). Likewise, the memory array can include a number of memory modules (e.g., DIMMs, or the like). An example sled depicting individual components (e.g., drives, modules, etc.) of the arrays is depicted in FIG. 8. In this illustrative example, sled 804 is depicted. In general, sled 804 can comprise similar components as sled 504 of FIG. 5. That is, sled 804 is depicted including multiple storage resource processing circuits and array subsets as depicted with respect to the sled 504 of FIG. 5.

Turning now to FIG. 8, sled 804 houses physical storage resources 805, which include removable storage drive array subsets 833-1 to 833-2, storage resource processing circuitry 835-1 to 835-2, and memory array subsets 837-1 to 837-2. As depicted, storage resource processing circuitry 835-1 is operably coupled to removable storage drive array subset 833-1 and memory array subset 837-1 while storage resource processing circuitry 835-2 is operably coupled to removable storage drive array subset 833-2 and memory array subset 837-2.

In this illustrative example, removable storage drive array subsets 833-1 to 833-2 can include storage devices 853. For example, as depicted, removable storage drive array subset 833-1 includes 8 storage devices 853-11 and 853-18 while removable storage drive array subset 833-2 includes 8 storage devices 853-21 to 853-28. Accordingly, removable storage drive array (including both removable storage drive array subsets 833-1 and 833-2) includes 16 individual storage devices. In general, storage devices 853-11 to 853-18 and 853-21 to 853-28 can comprise any combination of a variety of storage devices implemented using any of a variety of technologies, such as, for example, magnetic storage devices, semiconductor (e.g., solid-state) storage devices, phase-change memory storage devices, holographic data storage devices, or the like and can be packed in standard drive formats (e.g., SSDs) or as non-volatile memory modules, or a proprietary package. Furthermore, although each storage array subset is depicted including 8 devices 853, embodiments can feature more or less than 8 drives 853 per subset and can feature subsets having different numbers of drives. Example are not limited in this context.

Each of memory array subset 837-1 and 837-2 can include six memory modules. Specifically, memory array subset 837-1 includes memory modules 857-11 to 857-16 while memory array subset 837-2 includes memory modules 857-21 to 857-26. Memory modules 837-11 to 837-16 and 837-21 to 837-26 can include any combination of memory modules implemented using any of a variety of technologies, such as, for example, RAM, DRAM, DDRAM, synchronous DRAM, NAND memory, NOR memory, three-dimensional (3D) cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like.

As noted, memory array subsets 837-1 and 837-2 can each include a combination of volatile and non-volatile memory. For example, memory modules 857-11 to 857-14 and 857-21 to 857-24 can comprise DRAM DIMMs while 857-15 to 857-16 and 857-25 to 857-26 can comprise 3D cross-point DIMMs. Furthermore, although each memory array subset is depicted including 6 modules 857, embodiments can feature more or less than 6 modules 857 per subset and can feature subsets having different numbers of modules. Example are not limited in this context.

Storage resource processing circuitry 835-1 and 835-2 are operably coupled to removable storage drive array subsets and memory array subsets via electrical signaling media 828. In particular, storage resource processing circuitry 835-1 is operably coupled to storage drives 853-11 to 853-18 of removable storage drive array subset 833-1 and memory modules 837-11 to 837-16 of memory array subset 837-1 via electrical signaling media 828. Similarly, storage resource processing circuitry 835-2 is operably coupled to storage drives 853-21 to 853-28 of removable storage drive array subset 833-2 and memory modules 837-21 to 837-26 of memory array subset 837-2 via electrical signaling media 828.

Electrical signaling media 838 can be any signaling media, such as, for example, a PCIe Gen4 bus to provide NVMe compliant logical device interconnect capabilities. Storage resource processing circuitry 835-1 and 835-2 are further operably coupled to dual-mode optical network interface circuitry 826 via electrical signaling medial 828. It is noted, that electrical signaling media 828 coupling dual-mode optical network interface circuitry 826 to storage resource processing circuitry 835-1 and 835-2 can be a different type, configuration, and or support a different signaling standard than electrical signaling media 828 coupling storage resource processing circuitry 835-1 and 835-2 to removable storage drive array subsets and memory array subsets. Examples are not limited in this context.

Furthermore, sled 804 can feature dual-mode optical network interface circuitry 826 including optical transceiver module(s) 827 coupled to optical connector 816A of MPCM 816 via optical channels 825. Sled 804 can additionally, feature power connector 816B of MPCM 816 to provide power to components of sled 804 via power transmission media 824. The optical signaling media 825 can include a number of optical channels. Each optical channel can have a specific bandwidth. In some examples, the optical channels 825 can have a bandwidth between 20 and 220 Gigabytes per second (GB/s).

It is noted, that the sled architecture depicted in this illustrative example provides an advantage in that wear leveling of the storage devices in the removable storage device array 833 can be implemented across all the devices 853 in a group, across individual ones of the devices 853, or across sub-groups of the devices 853. In particular, storage resource processing circuits 835-1 and 835-2 can be configured to maintain information indicative of wear leveling statistics for devices 853. In some examples, storage resource processing circuits 835-1 and 835-2 can be configured to communicate with on-board memory controllers of devices 853 (not shown) to determine wear leveling characteristics maintained at the device level. Accordingly, during operation, storage resource processing circuits 835-1 and 835-2 can be configured to implement wear leveling techniques for all device in the array as a group, for individual devices, or for sub-groups of devices.

Figure 9:
FIG. 9 illustrates a second example logic flow.

FIG. 9 illustrates a logic flow, which may be representative of some or all of the operations executed by one or more logic, features, or devices described herein, such as, for example, sled 804. Although logic flow 900 can be implemented on any rack according to some embodiments, the sled 804 depicted in FIG. 8 is used as a reference to describe the example logic flows. However, this is done for convenience and clarity of presentation only and not to be limiting.

In this illustrative example, logic flow 900 can begin at block 910. At block 910 "receive an information element to include indications of data to write to non-volatile memory of physical storage resources of a sled of a data center" an information element including indications of data to write to non-volatile memory of a sled in a data center can be received. For example, an information element including data to be written to removable storage drive array subset 853-1 can be received by storage resource processing circuits 835-1. As another example, an information element including data to be written to removable storage drive array subset 853-2 can be received by storage resource processing circuits 835-2.

Continuing to block 920 "determine, by processing circuitry of the sled, a location in non-volatile memory to write the data" a location in non-volatile memory of the sled to write the data can be determined. For example, processing circuit 835-1 can determine which storage device 853-11 to 853-18 to write the data to, for example, based on a wear leveling technique. As another example, processing circuit 835-2 can determine which storage device 853-21 to 853-28 to write the data to, for example, based on a wear leveling technique. In some examples, processing circuit 835-1 and/or 853-2 can implement any of a variety of wear leveling techniques, such as, for example, static wear leveling techniques, dynamic wear leveling techniques, or the like.

Figure 10:
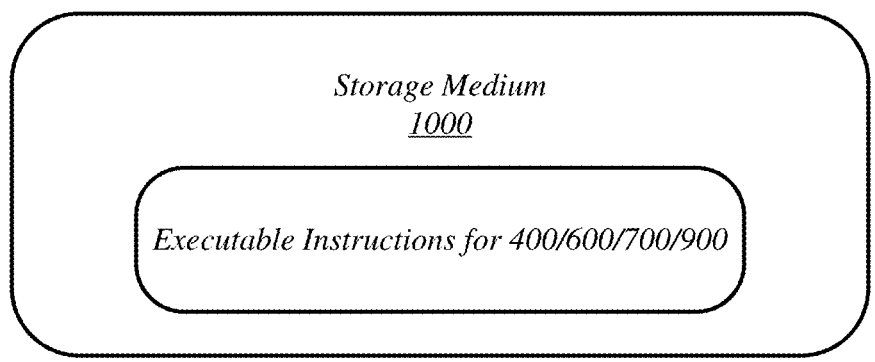
FIG. 10 illustrates an example storage medium.

FIG. 10 illustrates an example of a storage medium 1000. Storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement technique 400, to implement logic flow 600, to implement technique 700, to implement logic flow 900, or to implement a logic flow or technique according to some embodiments. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
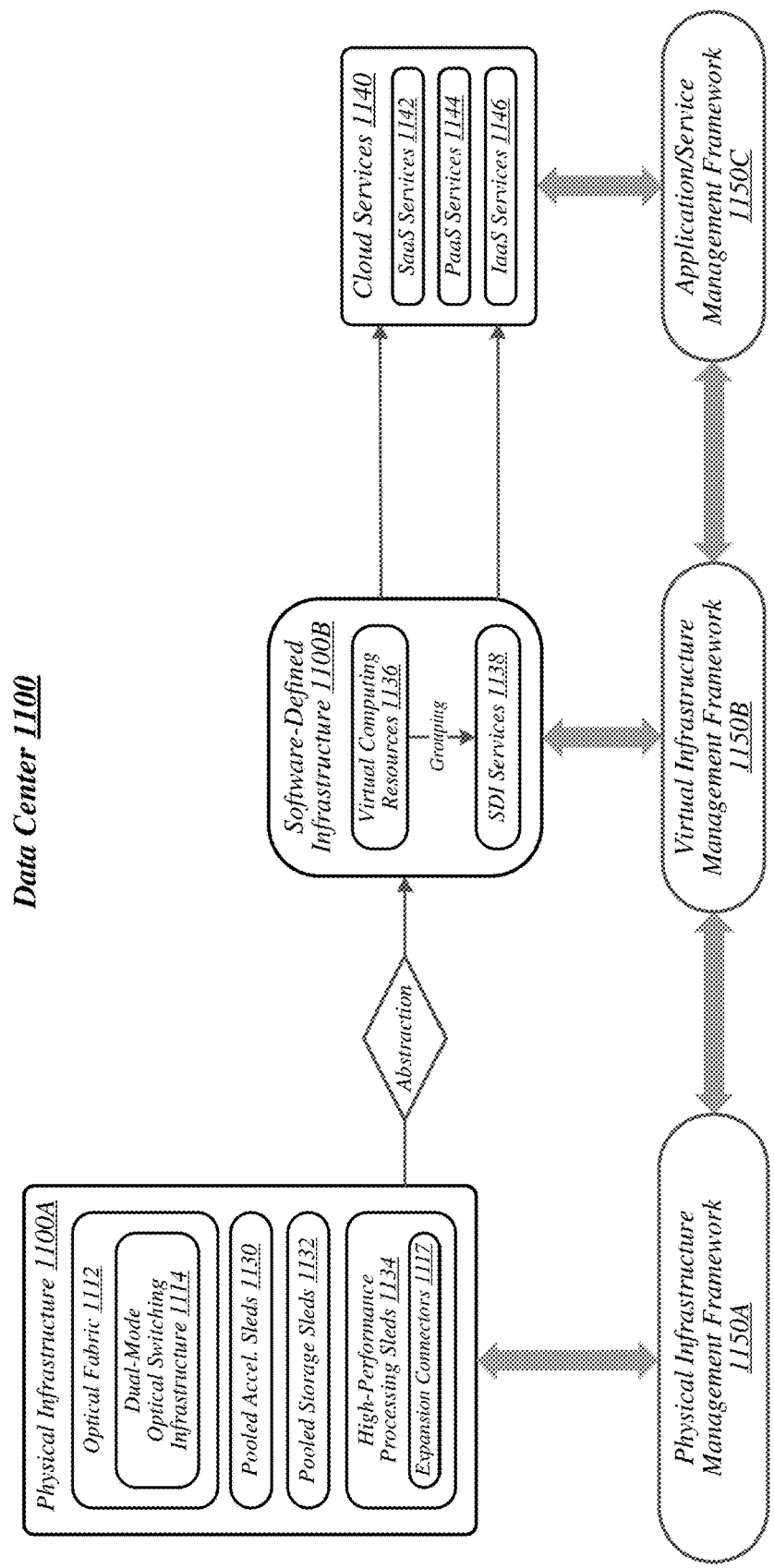
FIG. 11 illustrates a second example data center.

FIG. 11 illustrates an example of a data center 1100 that may generally be representative of one in/for which one or more techniques described herein may be implemented according to various embodiments. As reflected in this figure, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in this figure, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 112 of FIG. 1 or 412 of FIG. 4, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
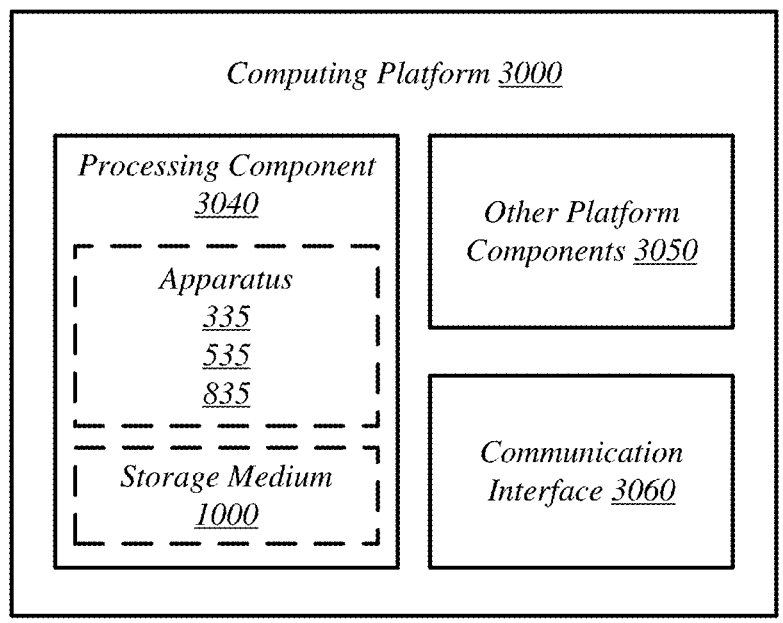
FIG. 12 illustrates an example computing platform.

FIG. 12 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may include hardware or logic for apparatus described herein, such as, for sleds circuitry 335, circuitry 535, circuitry 835, or storage medium 1000. Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present disclosure can be implemented in any of a variety of embodiments, such as, for example, the following non-exhaustive listing of example embodiments.

Example 1

An apparatus for a sled of a data center, comprising: a frame to couple to a rack of a data center, the frame arranged to receive a plurality of storage devices; a group of memory sockets to receive a plurality of memory modules comprising a combination of non-volatile memory modules and volatile memory modules; and at least one storage resource processing circuit to couple to the plurality of storage devices and the plurality of memory modules, the at least one storage resource processing circuit configured to store data on the plurality of storage device and to store metadata associated with the data on the non-volatile memory modules of the plurality of memory modules.

Example 2

The apparatus of example 1, the at least one storage resource processing circuit comprising a processor component to compress the metadata and store the compressed metadata on the non-volatile memory modules.

Example 3

The apparatus of example 2, the processor component to decompress the compressed metadata to retrieve the metadata from the non-volatile memory modules.

Example 4

The apparatus of example 1, the at least one storage resource processing circuit to receive a packet comprising indications of data to be stored on the plurality of storage devices, to determine whether the packet corresponds to a triggered operation, and to initiate the triggered operation.

Example 5

The apparatus of example 4, wherein the triggered operation comprises processing the data prior to writing the data to the plurality of storage devices.

Example 6

The apparatus of example 4, the at least one storage resource processing circuit a plurality of storage resource processing circuits, comprising: a first storage resource processing circuit coupled to a first subset of the plurality of storage devices and a first subset of the plurality of memory modules; and a second storage resource processing circuit coupled to a second subset of the plurality of storage devices and a second subset of the plurality of memory modules.

Example 7

The apparatus of example 6, comprising: the first storage resource processing circuit, the first subset of the plurality of storage devices, and the first subset of the plurality of memory modules corresponding to a first fault domain, and the second storage resource processing circuit, the second subset of the plurality of storage devices, and the second subset of the plurality of memory modules corresponding to a second fault domain.

Example 8

The apparatus of example 7, wherein the triggered operation comprises writing the data to ones of the first subset of the plurality of storage devices and to ones of the second subset of the plurality of storage devices to write the data to the first and the second fault domains.

Example 9

The apparatus of example 1, the storage resource processing circuity comprising a processor component to write the data to ones of the plurality of storage devices based on a wear leveling technique.

Example 10

The apparatus of example 9, the processor component to implement the wear leveling technique to the plurality of storage devices as a group or to subgroups of the plurality of storage devices.

Example 11

The apparatus of any one of examples 1 to 10, comprising a dual-mode optical network interface operably coupled to the at least one storage resource processing circuit to couple the plurality of storage devices and the plurality of memory modules to a network fabric.

Example 12

The apparatus of any one of examples 1 to 10, comprising the plurality of memory modules.

Example 13

The apparatus of any one of examples 1 to 10, comprising the plurality of storage devices.

Example 14

The apparatus of example 13, wherein the plurality of storage devices comprise solid-state-drives or non-volatile memory modules.

Example 15

A method for a storage sled of a rack of a data center, the method comprising: receiving, at a storage resource processing circuit of a sled of a data center, a request to access data stored on a plurality of storage devices of the sled; accessing metadata stored on non-volatile memory of a memory array of the sled, the metadata associated with the data; and processing the request to access the data based on the metadata.

Example 16

The method of example 15, comprising decompressing the metadata based on the metadata stored on the non-volatile memory being compressed.

Example 17

The method of example 16, the request to access the data comprising an indication to read the data, an indication to overwrite the data or an indication to change the data.

Example 18

The method of example 17, comprising updating the metadata stored on the non-volatile memory based on the request to access the data.

Example 19

The method of example 18, comprising compressing the updated metadata prior to storing on the non-volatile memory.

Example 20

At least one machine readable medium comprising a plurality of instructions that in response to being executed by a storage resource processing circuit of a sled of a data center cause the storage resource processing circuit to: receive a request to access data stored on a plurality of storage devices of the sled; access metadata stored on non-volatile memory of a memory array of the sled, the metadata associated with the data; and process the request to access the data based on the metadata.

Example 21

The at least one machine readable medium of example 20, comprising instructions that in response to being executed by the storage resource processing circuit of a sled of a data center cause the storage resource processing circuit to decompress the metadata.

Example 22

The at least one machine readable medium of example 21, the request to access the data comprising an indication to read the data, an indication to overwrite the data or an indication to change the data.

Example 23

The at least one machine readable medium of example 22, comprising instructions that in response to being executed by the storage resource processing circuit of a sled of a data center cause the storage resource processing circuit to update the metadata stored on the non-volatile memory based on the request to access the data.

Example 24

The at least one machine readable medium of example 23, comprising instructions that in response to being executed by the storage resource processing circuit of a sled of a data center cause the storage resource processing circuit to compress the updated metadata.

Example 25

A method for a storage sled of a rack of a data center, the method comprising: receiving, at a storage resource processing circuit of a sled of a data center, a packet comprising indications of data to be stored on a plurality of storage devices of the sled; determining whether the packet corresponds to a triggered operation; and initiating the triggered operation.

Example 26

The method of example 25, wherein the triggered operation comprises processing the data prior to writing the data to the plurality of storage devices.

Example 27

The method of example 25, the storage resource processing circuit a one of a plurality of storage resource processing circuits, each of the plurality of storage resource processing circuits corresponding to a different fault domain, the method comprising writing the data to at least two of the different fault domains.

Example 28

At least one machine readable medium comprising a plurality of instructions that in response to being executed by a storage resource processing circuit of a sled of a data center cause the storage resource processing circuit to: receive a packet comprising indications of data to be stored on plurality of storage devices of the sled; determining whether the packet corresponds to a triggered operation; and initiating the triggered operation.

Example 29

The at least one machine readable medium of example 28, wherein the triggered operation comprises processing the data prior to writing the data to the plurality of storage devices.

Example 30

The at least one machine readable medium of example 28, the storage resource processing circuit a one of a plurality of storage resource processing circuits, each of the plurality of storage resource processing circuits corresponding to a different fault domain, comprising instructions that in response to being executed by the storage resource processing circuit of a sled of a data center cause the storage resource processing circuit to write the data to at least two of the different fault domains.

Example 31

A method comprising: receiving, at a storage resource processing circuit of a sled of a data center, a packet comprising indications of data to be stored on a plurality of storage devices of the sled; and writing the data to ones of the plurality of storage devices based on a wear leveling technique.

Example 32

The method of example 31, the storage resource processing circuit to implement the wear leveling technique to the plurality of storage devices as a group or to subgroups of the plurality of storage devices.

Example 33

At least one machine readable medium comprising a plurality of instructions that in response to being executed by a storage resource processing circuit of a sled of a data center cause the storage resource processing circuit to: receive a packet comprising indications of data to be stored on a plurality of storage devices of the sled; and write the data to ones of the plurality of storage devices based on a wear leveling technique.

Example 34

The at least one machine readable medium of example 33, comprising instructions that in response to being executed by the storage resource processing circuit of a sled of a data center cause the storage resource processing circuit to implement the wear leveling technique to the plurality of storage devices as a group or to subgroups of the plurality of storage devices.

What is claimed is:
1. An apparatus for a sled of a data center, comprising:
a frame to couple to a rack of a data center, the frame arranged to receive a plurality of storage devices;
a group of memory sockets to receive a plurality of memory modules comprising a combination of non-volatile memory modules and volatile memory modules; and
at least one storage resource processing circuit to couple to the plurality of storage devices and the plurality of memory modules, the at least one storage resource processing circuit configured to store data on the plurality of storage devices and to store metadata associated with the data on the non-volatile memory modules of the plurality of memory modules, the at least one storage resource processing circuit to receive a packet comprising indications of data to be stored on the plurality of storage devices, to determine whether the packet corresponds to a triggered operation, wherein the triggered operation comprises processing the data prior to writing the data to the plurality of storage devices, wherein the at least one storage resource processing circuit of a plurality of storage resource processing circuits comprises a first storage resource processing circuit coupled to a first subset of the plurality of storage devices and coupled to a first subset of the plurality of memory modules; and a second storage resource processing circuit coupled to a second subset of the plurality of storage devices and coupled to a second subset of the plurality of memory modules.

2. The apparatus of claim 1, the at least one storage resource processing circuit comprising a processor component to compress the metadata and store the compressed metadata on the non-volatile memory modules.

3. The apparatus of claim 2, the processor component to decompress the compressed metadata to retrieve the metadata from the non-volatile memory modules.

4. The apparatus of claim 1, comprising: the first storage resource processing circuit, the first subset of the plurality of storage devices, and the first subset of the plurality of memory modules corresponding to a first fault domain, and the second storage resource processing circuit, the second subset of the plurality of storage devices, and the second subset of the plurality of memory modules corresponding to a second fault domain.

5. The apparatus of claim 4, wherein the triggered operation comprises writing the data to ones of the first subset of the plurality of storage devices and to ones of the second subset of the plurality of storage devices to write the data to the first and the second fault domains.

6. The apparatus of claim 1, the storage resource processing circuit comprising a processor component to write the data to ones of the plurality of storage devices based on a wear leveling technique.

7. The apparatus of claim 6, the processor component to implement the wear leveling technique to the plurality of storage devices as a group or to subgroups of the plurality of storage devices.

8. The apparatus of claim 1, comprising a dual-mode optical network interface operably coupled to the at least one storage resource processing circuit to couple the plurality of storage devices and the plurality of memory modules to a network fabric.

9. The apparatus of claim 1, comprising the plurality of memory modules.

10. The apparatus of claim 1, comprising the plurality of storage devices.

11. The apparatus of claim 10, wherein the plurality of storage devices comprise solid-state-drives or non-volatile memory modules.

12. A method for a storage sled of a rack of a data center, the method comprising:
- receiving, at a first storage resource processing circuit of a sled of a data center, a request to access data stored on a plurality of storage devices of the sled;
- the sled comprising a frame to couple to a rack of a data center, the frame arranged to receive the plurality of storage devices;
- the sled comprising a group of memory sockets to receive a plurality of memory modules comprising a combination of non-volatile memory modules and volatile memory modules;
- the first storage resource processing circuit to store data on the plurality of storage devices and to store metadata associated with the data on the non-volatile memory modules of the plurality of memory modules;
- the first storage resource processing circuit coupled to a first subset of the plurality of storage devices and a first subset of the plurality of memory modules, wherein the sled of the data center further comprises a second storage resource processing circuit coupled to a second subset of the plurality of storage devices and a second subset of the plurality of memory modules;
- accessing, by the first storage resource processing circuit, metadata stored on non-volatile memory of the first subset of the plurality of memory modules of a memory array of the sled, the metadata associated with the data;
- determining, by the first storage resource processing circuit, access permissions based on the metadata in response to the request; and
- processing the request to access the data prior to accessing the data based on the metadata.

13. The method of claim 12, comprising decompressing the metadata based on the metadata stored on the non-volatile memory being compressed.

14. The method of claim 13, the request to access the data comprising an indication to read the data, an indication to overwrite the data or an indication to change the data.

15. The method of claim 14, comprising updating the metadata stored on the non-volatile memory based on the request to access the data.

16. The method of claim 15, comprising compressing the updated metadata prior to storing on the non-volatile memory.

17. A method for a storage sled of a rack of a data center, the method comprising:
- receiving, at a first storage resource processing circuit of a sled of a data center, a packet comprising indications of data to be stored on a first subset of a plurality of storage devices of the sled;
- the sled comprising a frame to couple to a rack of a data center, the frame arranged to receive the plurality of storage devices;
- the sled comprising a group of memory sockets to receive a plurality of memory modules comprising a combination of non-volatile memory modules and volatile memory modules;
- the first storage resource processing circuit to store data on the plurality of storage devices and to store metadata associated with the data on the non-volatile memory modules of the plurality of memory modules;
- the first storage resource processing circuit coupled to the first subset of the plurality of storage devices and a first subset of the plurality of memory modules, wherein the sled of the data center further comprises a second storage resource processing circuit coupled to a second subset of the plurality of storage devices and a second subset of the plurality of memory modules;
- determining, by the first storage resource processing circuit, whether the packet corresponds to a triggered operation; and
- initiating the triggered operation, wherein the triggered operation comprises processing the data prior to writing the data to the first subset of the plurality of storage devices.

18. The method of claim 17, wherein the triggered operation comprises processing the data prior to writing the data to the plurality of storage devices.

19. The method of claim 17, the at least one storage resource processing circuit a plurality of storage resource processing circuits, each of the plurality of storage resource processing circuits corresponding to a different fault domain, the method comprising writing the data to at least two of the different fault domains.

20. A method comprising:
- receiving, at a first storage resource processing circuit of a sled of a data center, a packet comprising indications of data to be stored on a plurality of storage devices of the sled;
- the sled comprising a frame to couple to a rack of a data center, the frame arranged to receive the plurality of storage devices;
- the sled comprising a group of memory sockets to receive a plurality of memory modules comprising a combination of non-volatile memory modules and volatile memory modules;
- the first storage resource processing circuit to store data on the plurality of storage devices and to store metadata associated with the data on the non-volatile memory modules of the plurality of memory modules;
- the first storage resource processing circuit coupled to a first subset of the plurality of storage devices and a first subset of the plurality of memory modules, wherein the sled of the data center further comprises a second storage resource processing circuit coupled to a second subset of the plurality of storage devices and a second subset of the plurality of memory modules;
- determining, by the first storage resource processing circuit, whether the packet corresponds to a triggered operation; and
- initiating the triggered operation, wherein the triggered operation comprises processing the data prior to writing, by the first storage resource processing circuit, the data to ones of the plurality of storage devices, in the first subset of the plurality of storage devices, based on a wear leveling technique.

21. The method of claim 20, the first storage resource processing circuit to implement the wear leveling technique to the plurality of storage devices as a group or to subgroups of the plurality of storage devices.

* * * * *